United States Patent
Kong

(10) Patent No.: US 9,061,648 B2
(45) Date of Patent: Jun. 23, 2015

(54) METHOD OF FORMING TEAR LINE OF AIRBAG USING IN-MOLD BLADE

(75) Inventor: Byung Seok Kong, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 354 days.

(21) Appl. No.: 13/075,798

(22) Filed: Mar. 30, 2011

(65) Prior Publication Data

US 2012/0049489 A1    Mar. 1, 2012

(30) Foreign Application Priority Data

Aug. 31, 2010   (KR) .................. 10-2010-0084856

(51) Int. Cl.

| B29C 45/76 | (2006.01) |
|---|---|
| B60R 21/2165 | (2011.01) |
| B29C 37/00 | (2006.01) |
| B29C 45/00 | (2006.01) |
| B29C 45/56 | (2006.01) |
| B29L 31/30 | (2006.01) |

(52) U.S. Cl.
CPC ......... B60R 21/2165 (2013.01); B29C 37/0057 (2013.01); B29C 45/0081 (2013.01); B29C 45/5675 (2013.01); B29C 45/76 (2013.01); B29L 2031/3038 (2013.01)

(58) Field of Classification Search
None
See application file for complete search history.

(56) References Cited

U.S. PATENT DOCUMENTS

| 2002/0084543 A1* | 7/2002 | Buja ........................... 264/40.4 |
|---|---|---|
| 2003/0020202 A1 | 1/2003 | Ueno et al. |
| 2004/0113303 A1* | 6/2004 | Frey ........................... 264/40.6 |
| 2006/0118981 A1* | 6/2006 | Cvengros et al. ........... 264/40.1 |
| 2007/0102903 A1 | 5/2007 | Kong |
| 2007/0278708 A1* | 12/2007 | Nahill et al. ................. 264/40.3 |
| 2009/0049975 A1* | 2/2009 | Tada et al. ...................... 83/875 |

FOREIGN PATENT DOCUMENTS

| JP | 2003-326559 A | 11/2003 |
|---|---|---|
| JP | 2006-248073 A | 9/2006 |
| JP | 2006-272650 A | 10/2006 |
| JP | 2008-188789 A | 8/2008 |
| KR | 10-2007-0049323 A | 5/2007 |
| KR | 10-2009-0062127 A | 6/2009 |

* cited by examiner

Primary Examiner — Ryan Ochylski
(74) Attorney, Agent, or Firm — Morgan, Lewis & Bockius LLP

(57) ABSTRACT

A method of forming a tear line of an airbag door using an in-mold blade, may include a) confirming a time point when resin flow in an airbag door tear line portion may be completed in an injection mold, b) transferring a resin arrival signal to a blade operation portion for operating the in-mold blade, c) moving the in-mold blade forward at an in-mold blade forward time point that substantially corresponds to a receiving time of the resin arrival signal, d) completing the forward movement of the in-mold blade when the resin may be intercepted and dwelling starts, e) moving the in-mold blade backward before the dwelling may be completed, and f) completing the backward movement of the in-mold blade after the dwelling may be completed and cooling starts.

8 Claims, 14 Drawing Sheets

| CLASSIFI-CATION | BLADE POSITION | INJECTION PROCESS ||| RESULTS |||
| --- | --- | --- | --- | --- | --- | --- | --- |
| | | FILLING | DWELLING | COOLING | EXPOSURE TEAR LINE | ADHESION TEAR LINE | DEFORMATION AFTER HEAT-RESISTANCE CYCLE |
| EARLY FORWARD MOVEMENT | FORWARD MOVEMENT | | | | ○ | × | × |
| | BACKWARD MOVEMENT | | | | | | |
| EARLY BACKWARD MOVEMENT | FORWARD MOVEMENT | | | | × | ○ | × |
| | BACKWARD MOVEMENT | | | | | | |
| NO BACKWARD MOVEMENT | FORWARD MOVEMENT | | | | × | × | ○ |
| | BACKWARD MOVEMENT | | | | | | |
| OPTIMUM BACKWARD MOVEMENT | FORWARD MOVEMENT | | | OPTIMUM CONDITION | × | × | × |
| | BACKWARD MOVEMENT | | | | | | |

Fig.9

METHOD OF FORMING TEAR LINE OF AIRBAG USING IN-MOLD BLADE

CROSS-REFERENCE TO RELATED APPLICATION

The present application claims priority to Korean Patent Application No. 10-2010-0084856, filed on Aug. 31, 2010 in the Korean Intellectual Property Office, the entire contents of which is incorporated herein for all purposes by this reference.

BACKGROUND OF THE INVENTION

1. Field of the Invention

The present invention relates to a tear line of a vehicle airbag door, and more particularly to a method of forming a tear line of a vehicle airbag door using an in-mold blade.

2. Description of Related Art

In general, an airbag is installed in front of a driver seat or a passenger seat in order to protect a driver or a passenger when an accident occurs. For example, an airbag provided in front of the passenger seat is typically installed at an upper end of a glove box provided at a lower end of an instrument panel.

According to an airbag device mounted in front of the passenger seat, if an airbag starts deployment, pressure is applied to a door plate, and a tear line around a door cover is torn to deploy the airbag. Here, the door plate is made of a steel material in the range of 0.8 t to 1.2 t, and the door cover and the tear line are made of a plastic material such as crash pad.

FIG. 1 is a view illustrating an airbag door in the related art.

As illustrated in FIG. 1, the airbag door 2 in the related art is assembled on the side of a crash pad 8 in which an airbag module 4 and an airbag 6 are accommodatingly installed.

The airbag door 2 is composed of a crash pad outer skin 10, a crash pad inner skin 12, and a porous form 14. In this case, the airbag door 2 has a tear line 16 on the crash pad 8 to facilitate the separation thereof when the airbag is operated.

The tear line 16 forms a door flange portion 18 that is provided by inwardly bending the edge of the airbag door 2 formed by the crash pad outer skin 10, and a crash pad flange portion 20 is formed on the crash pad 8 that corresponds to the door flange portion 18. Also, on the upper side of the crash pad inner skin 12, a groove portion 22 for facilitating the opening of the airbag door 2 is formed.

Also, a support bracket 24 is put just inside the passenger-side tear line 16 of the crash pad inner skin 12, and an inner end portion 26 of the crash pad inner skin 10 is formed therein to guide the separation when the airbag is expanded. In this case, the inner end portion 26 is cut off from the crash pad flange portion 20 of the crash pad outer skin 10, and thus the opening of the airbag door 2 is facilitated.

The airbag door 2 is opened in a manner that if an airbag electronic control unit (not illustrated) recognizes the occurrence of vehicle collision, an inflator is operated, and the airbag 6 is expanded to open the airbag door 2.

On the other hand, in the case of an invisible passenger-side airbag, a tear line of the passenger-side airbag door (PAB door) that is provided on an inner surface of the instrument panel formed by means of plastic injection for expansion of the airbag, for example, may be pre-molded using in-mold forming, milling process, laser process, and the like. The details thereof will now be described with reference to FIGS. 2 and 4A to 4D.

FIG. 2 is a view illustrating a method of forming a tear line of an airbag door using in-mold forming in the related art.

Referring to FIG. 2, according to the method of forming a tear line of an airbag door using in-mold forming in the related art, a tear line 50 of an airbag door 40 is in-mold molded by applying a "V"-shaped notch to a core mold 31 between the core mold 31 and a cavity mold 32.

Accordingly, the method of forming a tear line of an airbag door using in-mold forming in the related art has the problem that the external appearance of the tear line is bent due to differences in speed of solidification and resin flow speed between a notch portion and a notch neighboring portion, and thus the tear line may be exposed.

FIGS. 3A to 3C are views illustrating a method of forming a tear line of an airbag door using a milling process in the related art.

According to the method of forming a tear line of an airbag door using a milling process in the related art, as illustrated in FIG. 3A, a notch is formed on the tear line 50 on the rear surface of the airbag door 40 by a milling process using a milling head 60 after the airbag door 40 is formed. FIG. 3B illustrates the forming of the tear line 50 on the airbag door 40, and FIG. 3C illustrates a cross-section cut along line A-A of FIG. 3B.

In the method of forming the tear line of the airbag door using the milling process in the related art, the rupture strength of the tear line 50 may be determined by the residual thickness and the intermediate bridge width. In this case, it is required to invest in the processing equipment and a fix jig for post-processing, cost increase due to the process addition may occur, and the quality of the processed surface is not uniform.

FIGS. 4A to 4D are views illustrating a method of forming a tear line of an airbag door using a laser process in the related art.

According to the method of forming a tear line of an airbag door using a laser process in the related art, as illustrated in FIG. 4A, a notch is formed on the tear line 50 on the rear surface of the airbag door 40 by a laser process using a laser head 70 after the airbag door 40 is formed. FIG. 4B illustrates the forming of the tear line 50 on the airbag door 40, and FIG. 4C illustrates a cross-section cut along line B-B in FIG. 4B.

In the method of forming the tear line of the airbag door using the laser process in the related art, the rupture strength of the tear line 50 may be determined by the residual thickness and pitch of a hole processed by laser irradiation. In this case, as illustrated in FIG. 4D, processing equipment 72 and a fix jig 74 for post-processing of the airbag door 40 are additionally required, and thus cost increase due to the process addition may occur.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a method of forming a tear line of an airbag door using an in-mold blade, which can omit separate processes for forming the tear line by integrally forming the tear line when forming the airbag door.

Another aspect to be achieved by the present invention may be to provide a method of forming a tear line of an airbag door using an in-mold blade, which makes the tear line not exposed to the outside by preventing the occurrence of bending when filling resin in the tear line portion.

Still another aspect to be achieved by the present invention may be to provide a method of forming a tear line of an airbag door using an in-mold blade, which can minimize a tear-line error by sensing a flow of resin for forming the airbag door and moving the blade forward at a constant time point.

In an aspect of the present invention, the method of forming a tear line of an airbag door using an in-mold blade, may include the steps of a) confirming a time point when resin flow in an airbag door tear line portion may be completed in an injection mold, b) transferring a resin arrival signal to a blade operation portion for operating the in-mold blade, c) moving the in-mold blade forward at an in-mold blade forward time point that substantially corresponds to a receiving time of the resin arrival signal, d) completing the forward movement of the in-mold blade when the resin may be intercepted and dwelling starts, e) moving the in-mold blade backward before the dwelling may be completed, and f) completing the backward movement of the in-mold blade after the dwelling may be completed and cooling starts.

In the step a), a temperature sensor installed in a final filling completion portion in an invisible passenger-side airbag door generates the resin arrival signal.

In the step d), the backward movement of the in-mold blade may be performed within a predetermined time period before the dwelling may be completed, and the in-mold blade moves backward at a time point when a tear line residual depth may be not reduced due to adhesion of the resin inside the tear line, wherein in the step d), the in-mold blade moves backward at a time point when a tear line residual depth may be not reduced due to adhesion of the resin inside the tear line, wherein the predetermined time period may be one to three seconds, and wherein in the step d), resin adhesion in the tear line may be prevented during the dwelling process by adjusting the speed of the backward movement of the in-mold blade, and force of friction between the in-mold blade and the neighboring resin may be minimized.

In the in-mold blade forward and backward movement processes in steps c) to f), the temperature in the neighborhood of the tear line may be adjusted in a manner that the temperature of a cavity mold of a tear line outer skin portion may be kept between a resin melting temperature and a thermal deformation temperature, the temperature of the in-mold blade may be adjusted in a range between the resin melting temperature and the thermal deformation temperature during the forward movement, and may be adjusted to a temperature at which the resin may be solidified before a predetermined time period of the backward movement.

The temperature of the in-mold blade may be adjusted to the temperature at which the resin may be solidified before a predetermined time period till the dwelling may be completed and the cooling starts.

The temperature of the in-mold blade may be adjusted in a range between the resin melting temperature and the thermal deformation temperature before the forward movement.

In further another aspect of the present invention, an airbag door integrally formed with a tear line that may be formed by the tear line forming method.

According to the present invention, separate processes for forming the tear line can be omitted by integrally forming the tear line when forming the airbag door, and thus the investment cost and manufacturing cost can be reduced in comparison to the laser scoring.

According to the present invention, the tear line is not exposed to the outside by preventing the occurrence of bending when filling resin in the tear line portion, and thus the quality of external appearance can be improved in comparison to the in-mold forming.

According to the present invention, a tear-line error, for example, error in external appearance and dimensions, can be minimized by sensing a flow of resin for forming the airbag door and moving the blade forward at a constant time point.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 9 is a view exemplifying a detailed injection process when forming a tear line of an airbag door using an in-mold blade according to an exemplary embodiment of the present invention.

Figure 1:
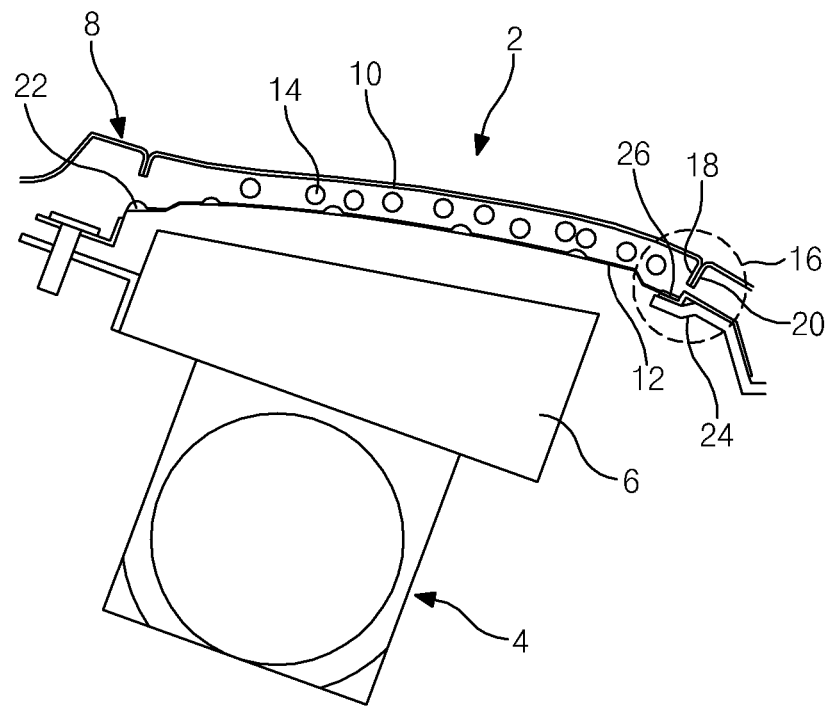
FIG. 1 is a view illustrating an airbag door in the related art.
Figure 2:
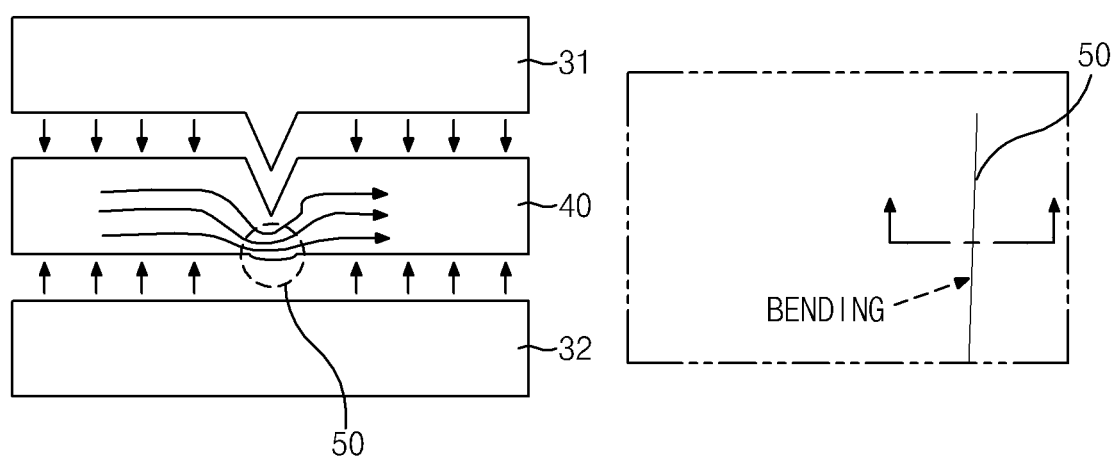
FIG. 2 is a view illustrating a method of forming a tear line of an airbag door using in-mold forming in the related art.
Figure 3A:
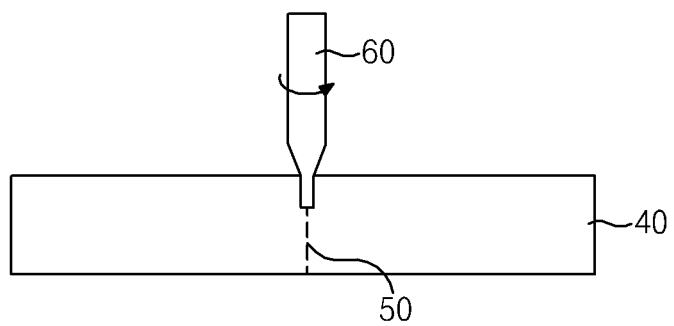
FIGS. 3A to 3C are views illustrating a method of forming a tear line of an airbag door using a milling process in the related art.
Figure 3B:
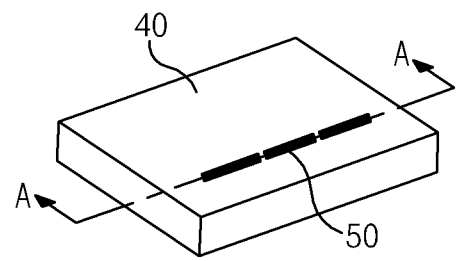
Figure 3C:
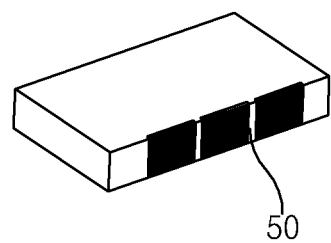
Figure 4A:
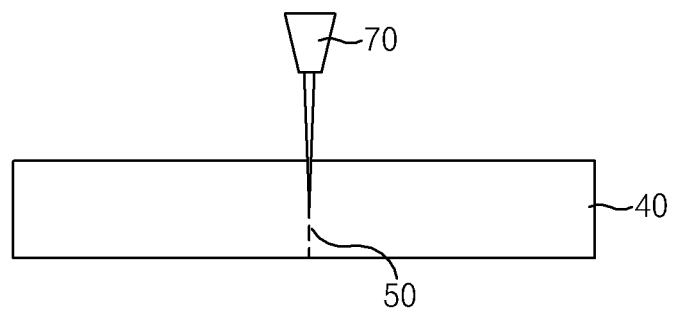
FIGS. 4A to 4D are views illustrating a method of forming a tear line of an airbag door using a laser process in the related art.
Figure 4B:
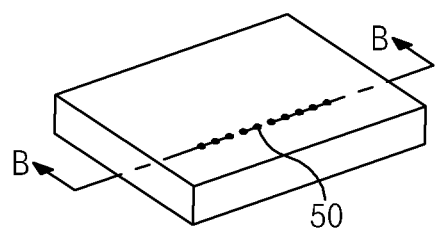
Figure 4C:
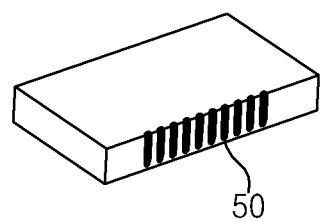
Figure 4D:
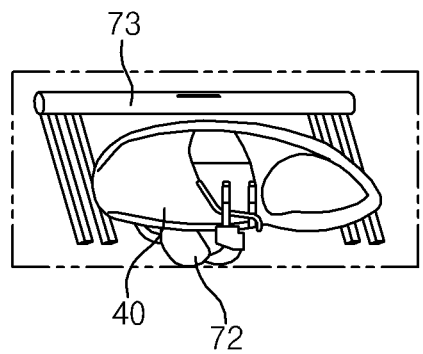

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

In the whole description of the present invention, the term "includes" and/or "including" used in the description means that one or more other components are not excluded in addition to the described components unless specifically described on the contrary.

Figure 5:
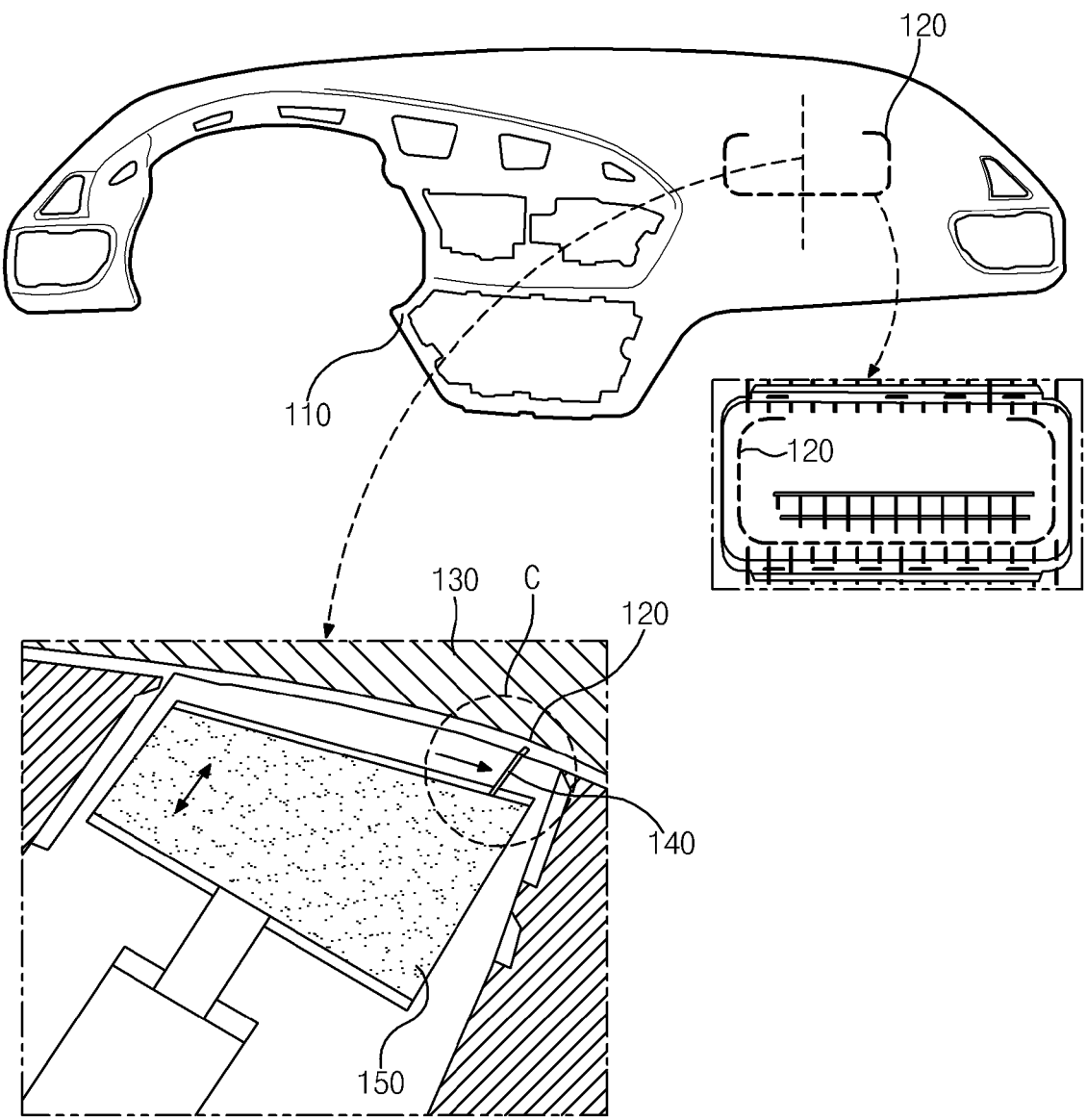
FIG. 5 is a view briefly illustrating a method of forming a tear line of an airbag door using an in-mold blade according to an exemplary embodiment of the present invention.
Figure 6A:
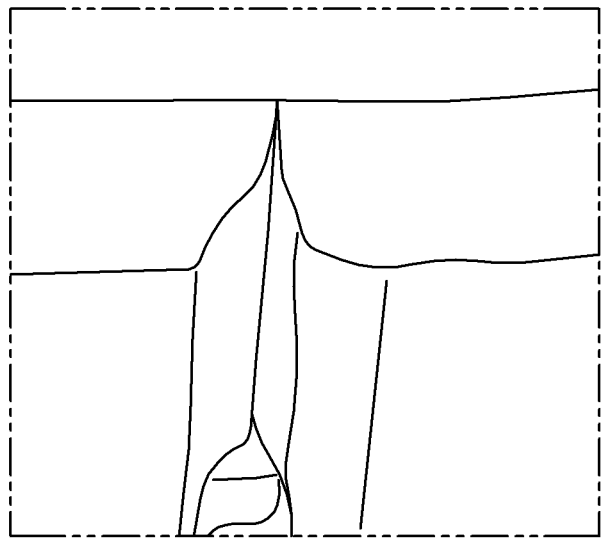
FIGS. 6A and 6B are photographs showing a C area that is a tear line portion illustrated in FIG. 5.
Figure 6B:
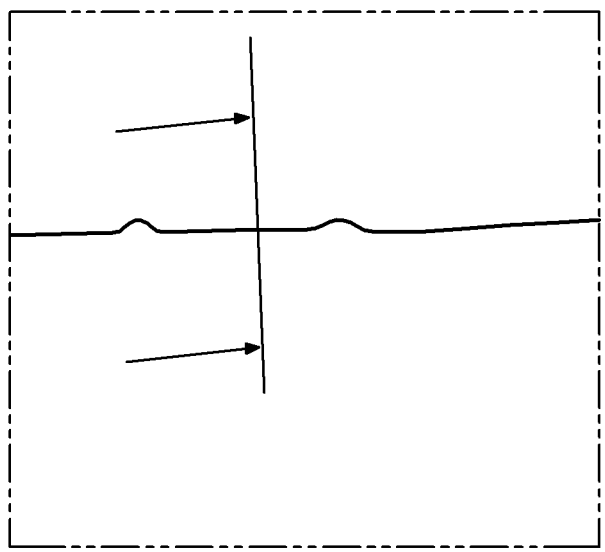

FIG. 5 is a view briefly illustrating a method of forming a tear line of an airbag door using an in-mold blade according to an exemplary embodiment of the present invention, and FIGS. 6A and 6B are photographs showing a C area that is a tear line portion illustrated in FIG. 5.

Referring to FIG. 5, a method of forming a tear line of an airbag door using an in-mold blade according to an exemplary embodiment of the present invention minimizes the exposure of an external appearance of a tear line 120 by moving an in-mold blade 140 forward and backward during an airbag door forming process.

The in-mold blade 140 is moved forward or backward by a slide core 150 for operating the in-mold blade. The reference numeral "110" denotes an invisible passenger-side airbag (PAB) door, and the tear line 120 is formed on the rear surface of the FAB door.

Specifically, a temperature sensor is installed in a final filling completion portion in the invisible passenger-side airbag door 110 so that the forward movement of the in-mold blade 140 can accurately start at a time point when a resin flow in a portion of the tear line 120 is completed. The temperature sensor transfers the resin arrival signal to a blade operating portion, for example, the slide core 150 to make the in-mold blade 140 move forward.

Also, the backward movement of the in-mold blade 140 is performed within one to three seconds before dwelling is completed, and the in-mold blade 140 moves backward at a time point when the residual depth of the tear line 120 is not reduced due to adhesion of the resin inside the tear line 120.

At this time, resin adhesion in the tear line 120 is prevented during the dwelling process by adjusting the speed of the backward movement of the in-mold blade 140, for example, the time and slope of backward displacement. Also, by minimizing the force of friction between the in-mold blade 140 and the neighboring resin, a cross-section that secures the stiffness enough to prevent the post-deformation in the tear line 120 can be implemented.

FIG. 6A is a photograph showing that the in-mold blade has moved forward up to the tear line portion, and FIG. 6B is a photograph showing that a tear line is formed by the in-mold blade.

As a result, according to the method of forming a tear line of an airbag door using an in-mold blade according to an exemplary embodiment of the present invention, in order to form the tear line of the airbag door that is a rupture-scheduled portion when the airbag is deployed, a filling completion time point of the tear line portion is sensed by a temperature sensor, and the in-mold blade is move forward and then backward at the dwelling and cooling time point. Accordingly, in a state where the tear line forming condition is maximally equal to that in the neighborhood, the tear line of the airbag door can be manufactured so that the tear line portion is not exposed to the outside.

Figure 7:
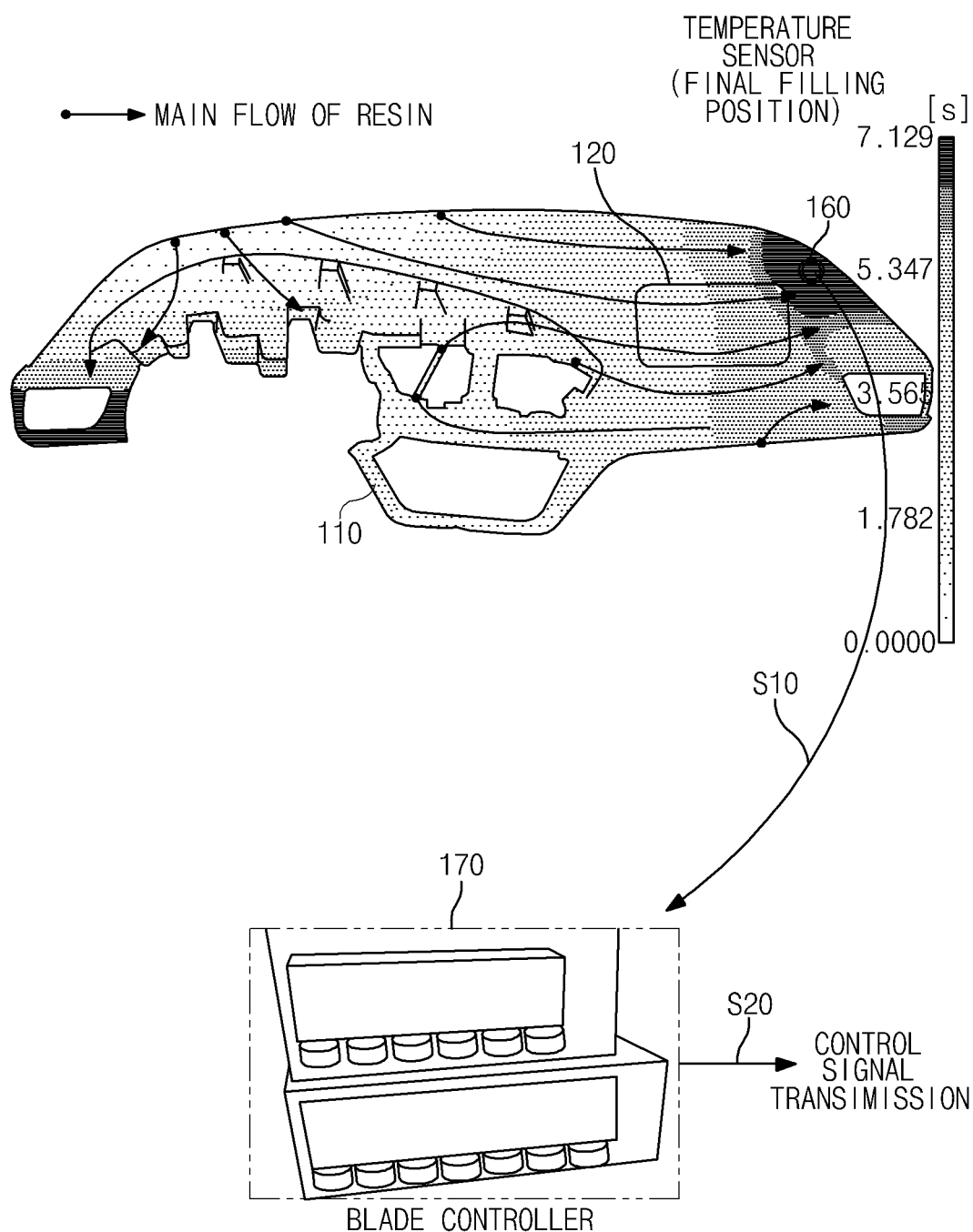
FIG. 7 is a view exemplifying a flow of resin when forming a tear line of an airbag door using an in-mold blade according to an exemplary embodiment of the present invention.

On the other hand, FIG. 7 is a view exemplifying a flow of resin when forming a tear line of an airbag door using an in-mold blade according to an exemplary embodiment of the present invention.

Referring to FIG. 7, as the method of forming a tear line of an airbag door using an in-mold blade according to an exemplary embodiment of the present invention, the temperature sensor 160 is installed in the final filling completion portion in the invisible passenger-side airbag door 110 so that the forward movement of the in-mold blade 140 accurately starts at a time point when the resin flow in the portion of the tear line 120 is completed.

In this case, the temperature sensor 160 transfers the resin arrival signal to the blade controller 170 (step S10), and the blade controller 170 transfers a control signal to the blade operating portion, for example, the slide core 150 (step S20) to make the in-mold blade 140 move forward.

The detailed forward and backward movement of the in-mold blade 140 will be described hereinafter with reference to FIG. 8.

Figure 8:
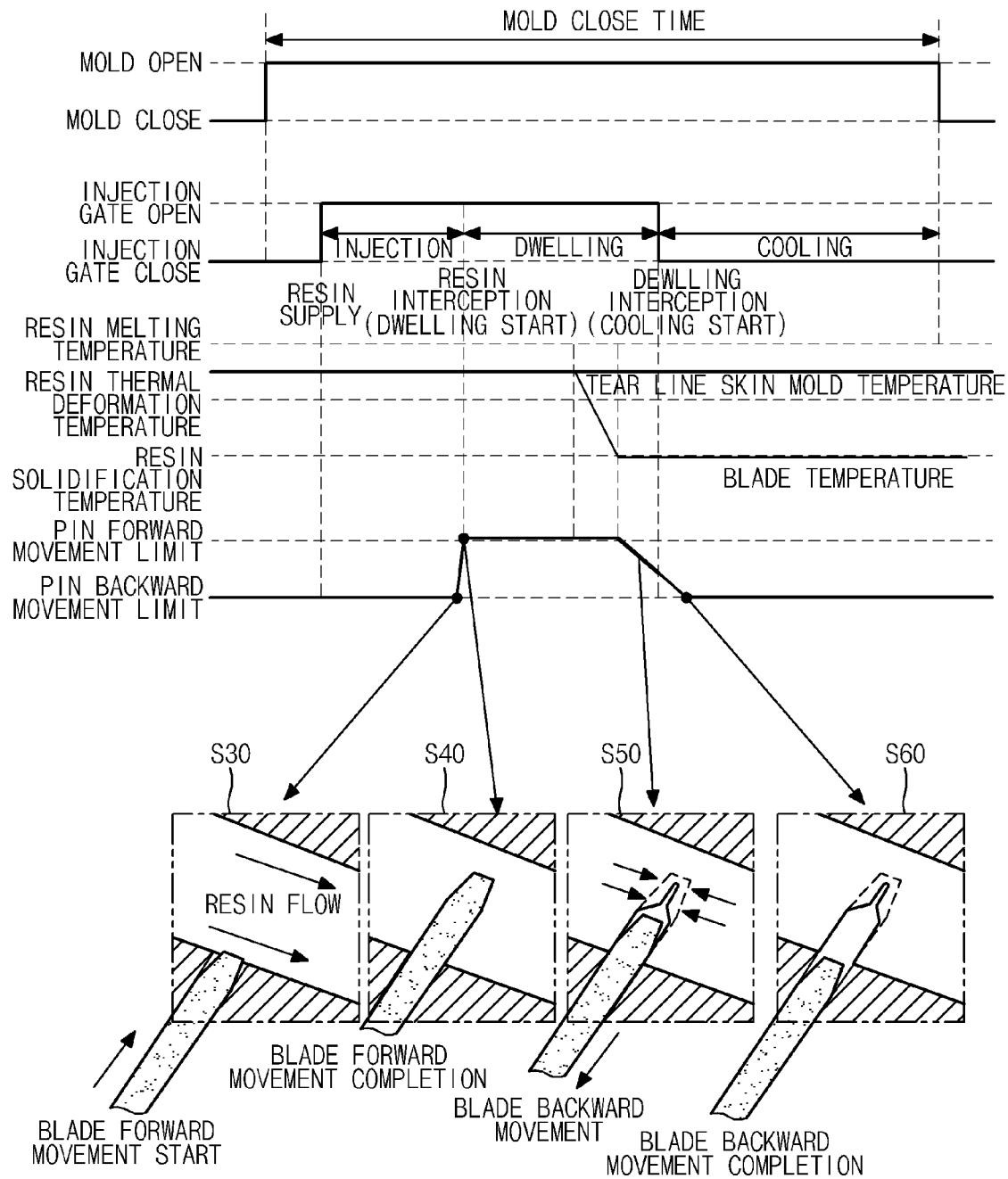
FIG. 8 is a view exemplifying a detailed operation process when forming a tear line of an airbag door using an in-mold blade according to an exemplary embodiment of the present invention.

FIG. 8 is a view exemplifying a detailed operation process when forming a tear line of an airbag door using an in-mold blade according to an exemplary embodiment of the present invention.

Referring to FIG. 8, in the method of forming a tear line of an airbag door using an in-mold blade according to an exemplary embodiment of the present invention, if the control signal is transferred from the blade controller 170, the in-mold blade 140 moves forward (step S30), wherein, when the forward movement of the in-mold blade 140 is completed (step S40) the resin flow is interrupted by the in-mold blade 140 and the dwelling starts.

Thereafter, the backward movement of the in-mold blade 140 is performed within one to three seconds before the dwelling is completed (step S50), and the in-mold blade 140 moves backward at a time point when the residual depth of the tear line 120 is not reduced due to the adhesion of the resin inside the tear line 120 to complete the backward movement when the cooling starts (step S60). At this time, the resin adhesion in the tear line 120 is prevented during the dwelling process through adjustment of the speed of the backward movement of the in-mold blade 140, for example, the time and slope of backward displacement.

Also, the temperature in the neighborhood of the tear line 120 is adjusted during the forward or backward cycling process in a manner that the temperature of the cavity mold 130 of the outer skin portion of the tear line 120 is kept between the resin melting temperature and the thermal deformation temperature. At this time, the temperature of the in-mold blade 140 is adjusted in a range between the resin melting temperature and the thermal deformation temperature during the forward movement, and is adjusted to a temperature at which the resin is solidified before one second for the backward movement.

Figure 10A:
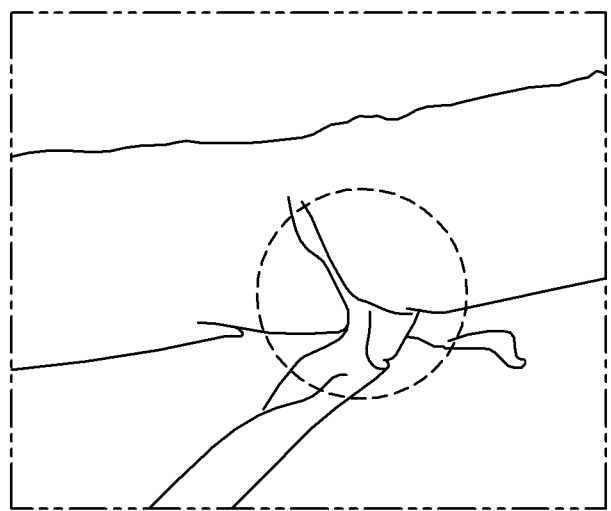
FIGS. 10A and 10B are photographs exemplifying the result of injection according to an early forward movement of the blade of FIG. 9.
Figure 10B:
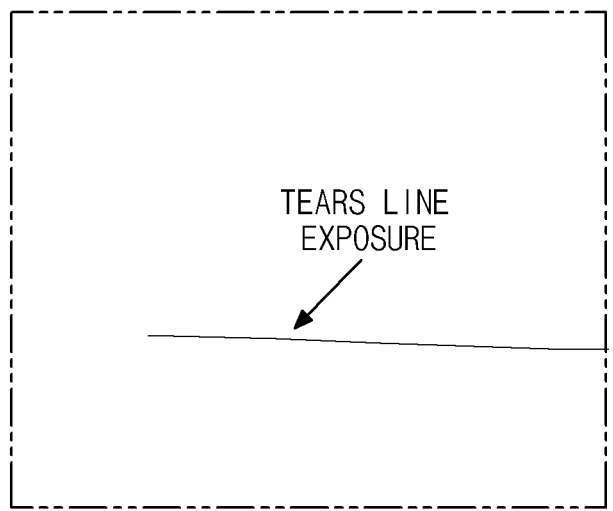
Figure 11A:
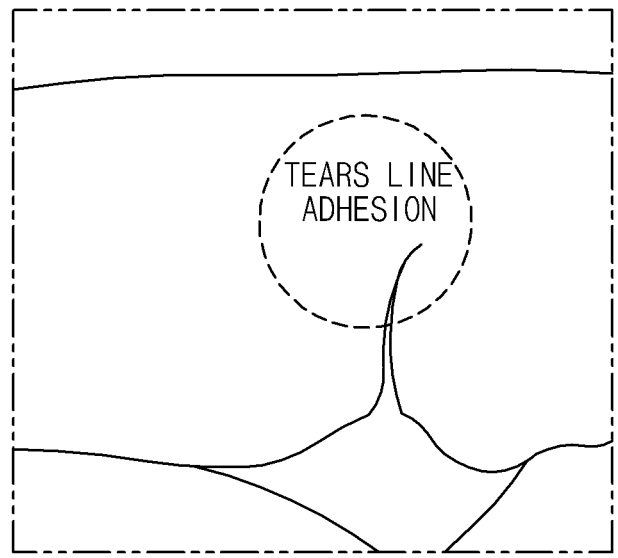
FIGS. 11A and 11B are photographs exemplifying the result of injection according to an early backward movement of the blade of FIG. 9.
Figure 11B:
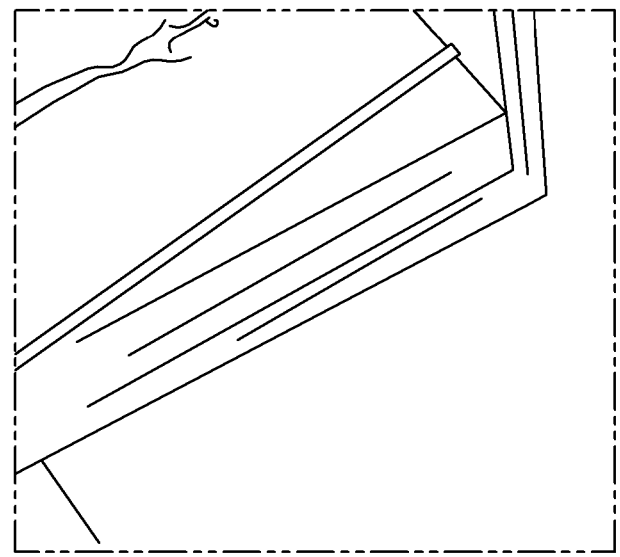
Figure 12A:
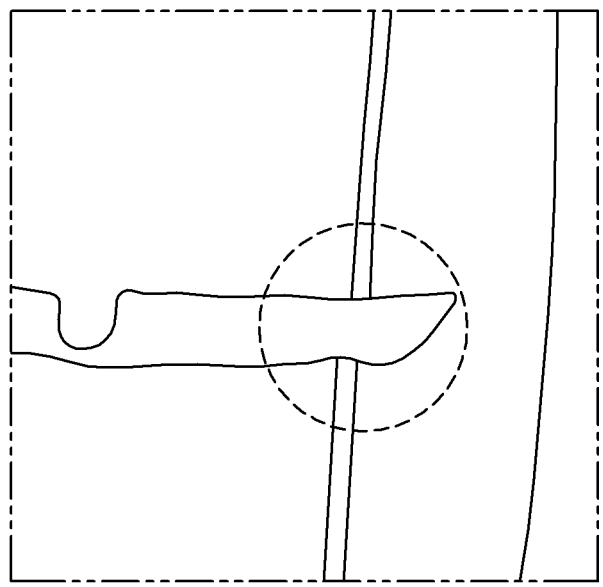
FIGS. 12A and 12B are photographs exemplifying the result of injection in the case where the blade of FIG. 9 does not move backward.
Figure 12B:
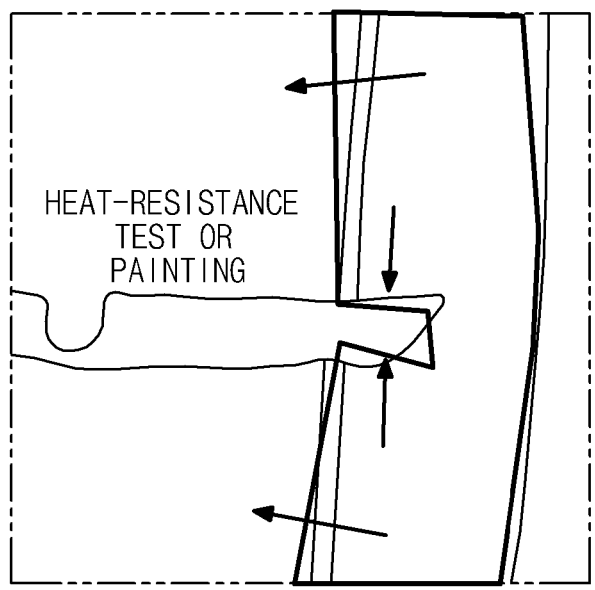
Figure 13A:
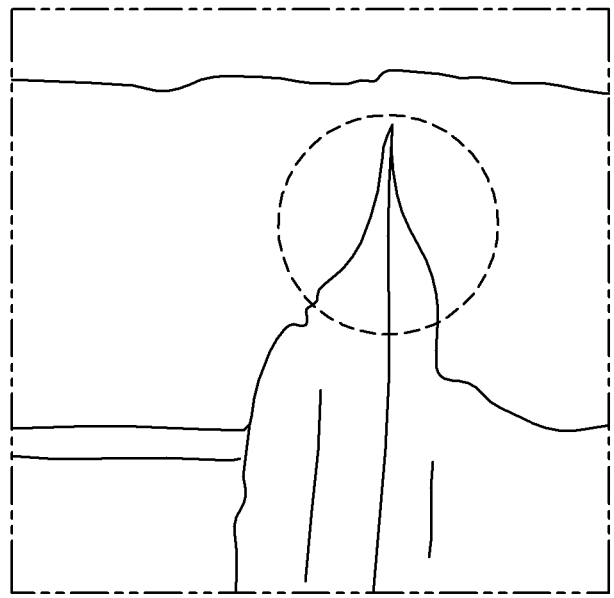
FIGS. 13A and 13B are photographs exemplifying the result of injection according to an optimum forward and backward movement of the blade of FIG. 9.
Figure 13B:
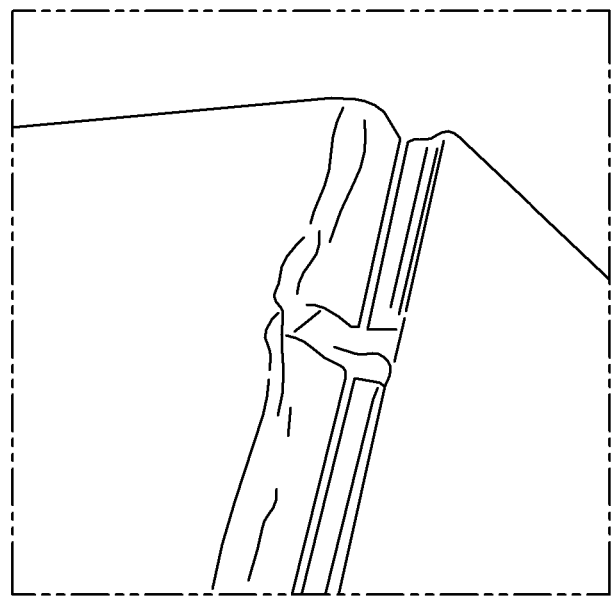

FIG. 9 is a view exemplifying a detailed injection process when forming a tear line of an airbag door using an in-mold blade according to an exemplary embodiment of the present invention. FIGS. 10A and 10B are photographs exemplifying the result of injection according to an early forward movement of the blade of FIG. 9, and FIGS. 11A and 11B are photographs exemplifying the result of injection according to an early backward movement of the blade of FIG. 9. FIGS. 12A and 12B are photographs exemplifying the result of injection in the case where the blade of FIG. 9 does not move backward, and FIGS. 13A and 13B are photographs exemplifying the result of injection according to an optimum forward and backward movement of the blade of FIG. 9.

Referring to FIG. 9, in a detailed injection process in forming the tear line of the airbag door using the in-mold blade according to an exemplary embodiment of the present invention, the resin flow speed in the neighborhood of the tear line becomes "0" at the time point for the forward movement, and the forward movement is performed just after the completion of the injection of the invisible passenger-side airbag door 110, as the optimum condition of the shape of the tear line according to the time point for the backward movement. Also, the backward movement is performed within one to three seconds before the dwelling is completed, and the backward movement speed can be determined to a level at which no backward movement adhesion occurs by adjusting the slope. Also, the temperature of the blade mold is kept over the thermal deformation temperature during the forward movement, and is lowered to the solidification expedition temperature.

According to the result of injection according to the early forward movement of the blade in FIG. 9, the tear line exposure occurs as shown in FIGS. 10A and 10B. According to the result of injection according to the early backward movement of the blade in FIG. 9, the tear line adhesion occurs as shown in FIGS. 11A and 11B. Also, according to the result of injection according to the no backward movement of the blade in FIG. 9, deformation occurs after a heat-resistance cycle as shown in FIGS. 12A and 12B, and thus a heat-resistance test or painting is required.

According to the result of injection according to the optimum forward and backward movements of the blade, as shown in FIG. 13, the tear line is not exposed, and the tear line adhesion does not occur. Also, no deformation occurs after the heat-resistance cycle.

As a result, according to the method of forming a tear line of an airbag door using an in-mold blade according to an exemplary embodiment of the present invention, separate processes for forming the tear line can be omitted by integrally forming the tear line when forming the airbag door, and thus the investment cost and manufacturing cost can be reduced in comparison to the laser scoring. Also, the tear line is not exposed to the outside by preventing the occurrence of bending when filling resin in the tear line portion, and thus the quality of external appearance can be improved in comparison to the in-mold forming. Also, a tear-line error, for example, error in external appearance and dimensions, can be minimized by sensing a flow of resin for forming the airbag door and moving the blade forward at a constant time point.

For convenience in explanation and accurate definition in the appended claims, the terms "forward" and "backward" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of forming a tear line of an airbag door using an in-mold blade, comprising the steps of:
    a) confirming a time point when resin flow in an airbag door tear line portion is completed in an injection mold;
    b) after the confirming the time point, transferring a resin arrival signal to a blade operation portion for operating the in-mold blade;
    c) moving the in-mold blade forward at an in-mold blade forward time point that substantially corresponds to a receiving time of the resin arrival signal;
    d) completing the forward movement of the in-mold blade for interrupting the resin flow by the in-mold blade and starting dwelling after the completing the forward movement of the in-mold blade;
    e) moving the in-mold blade backward before the dwelling is completed;
    f) completing the backward movement of the in-mold blade after the dwelling is completed and cooling starts;
    wherein in the step e), the backward movement of the in-mold blade begins before the dwelling is completed, and the in-mold blade moves backward at a time point when a tear line residual depth is not reduced due to adhesion of the resin inside the tear line; and
    wherein a predetermined time period between an initial backward movement of the in-mold blade and an end of the dwelling is one to three seconds, and
    wherein speed of the backward movement of the in-mold blade is kept constant through the duration of the backward movement.

2. The method according to claim 1, wherein in the step a), a temperature sensor installed in a final filling completion portion for forming an invisible passenger-side airbag door generates the resin arrival signal.

3. The method according to claim 1, wherein in the step d), resin adhesion in the tear line is prevented during the dwelling process by adjusting the speed of the backward movement of the in-mold blade, and force of friction between the in-mold blade and the neighboring resin is minimized.

4. The method according to claim 1, wherein in the in-mold blade forward and backward movement processes in steps c) to f), the temperature in the neighborhood of the tear line is adjusted in a manner that the temperature of a cavity mold of a tear line outer skin portion is kept between a resin melting temperature and a thermal deformation temperature, the temperature of the in-mold blade is adjusted in a range between the resin melting temperature and the thermal deformation temperature during the forward movement, and is adjusted to a temperature at which the resin is solidified before a predetermined time period of the backward movement.

5. The method according to claim 4, wherein the predetermined time period is one second.

6. The method according to claim 4, wherein the temperature of the in-mold blade is adjusted to the temperature at which the resin is solidified before a predetermined time period till the dwelling is completed and the cooling starts.

7. The method according to claim 4, wherein the temperature of the in-mold blade is adjusted in a range between the resin melting temperature and the thermal deformation temperature before the forward movement.

8. An airbag door integrally formed with a tear line that is formed by the tear line forming method according to claim 1.

* * * * *